United States Patent [19]

Rogelja

[11] Patent Number: 5,613,658
[45] Date of Patent: Mar. 25, 1997

[54] TRIPOD APPARATUS

[76] Inventor: Boris Rogelja, 9 Nelson Avenue, Padstow, New South Wales 2211, Australia

[21] Appl. No.: 423,187

[22] Filed: Apr. 18, 1995

[30] Foreign Application Priority Data

Apr. 18, 1994 [AU] Australia ................................ PM5157

[51] Int. Cl.$^6$ ..................................................... F16M 11/00
[52] U.S. Cl. ................... 248/163.1; 248/166; 248/354.1; 248/435
[58] Field of Search .............................. 248/163.1, 163.2, 248/166, 352, 354.7, 354.4, 354.5, 434, 435

[56] References Cited

U.S. PATENT DOCUMENTS

| 4,015,806 | 4/1977 | Cattermole ........................ 248/163.1 X |
| 4,993,635 | 2/1991 | Dupre .................................. 248/166 X |

FOREIGN PATENT DOCUMENTS

| 643898 | 8/1962 | Italy ..................................... 248/354.3 |
| 2222363 | 3/1990 | United Kingdom ................. 248/163.1 |

Primary Examiner—Ramon O. Ramirez
Assistant Examiner—Brian J. Hamilla
Attorney, Agent, or Firm—Jordan and Hamburg

[57] ABSTRACT

A tripod apparatus 10 having a generally triangular base 11, three upright members 13, 14, 15, each pivotally connected at one end to the base 10 proximate the respective corners of the base 10 and extending upwards to a support member 19 which, in use, provides a support point for raising or lowering an object such as a rescue basket along a cliff or building face. One of the uprights 15 is articulated so that the user may selectively move the support member 19 between a retracted position rearward of a forward side edge 17 of the base 11, and an extended position forward of the forward side edge 17. Preferably, the upright 15 is in the form of a bar linkage having a first elongate member 21 which is pivotally connected at its upper end to the support member 19 and at its other end to an intermediate position of a second elongate member 22. The second member 22 has one end pivotally connected to a rearward corner of the base 11 with its other end portion forming a lever 60 which is used to move the intermediate position thereof relative to the nominal forward side edge 17 of the base 11, which movement is transmitted to the support member 19 by the first elongate member 21.

19 Claims, 6 Drawing Sheets

TRIPOD APPARATUS

TECHNICAL FIELD

The present invention relates to a tripod apparatus useful for raising and lowering objects along a generally vertical face such as, for example, a cliff face or building face. Such a tripod apparatus is typically used for rescue purposes.

BACKGROUND OF THE INVENTION

Known tripods for rescue purposes normally include a triangular base and three upright members extending from respective corners of the base to a support member generally above and offset from the base. The support member includes an attachment point for a pulley or other device which is used to support an object. During use of such a tripod, a forward edge of the base is positioned near to but spaced from an edge of a cliff or building with the support member positioned closest to the edge. The support member can be moved from a position inwards of the edge of the cliff, building etc. to an extended position beyond that edge by lifting a rearward corner of the base so as to rotate the whole tripod apparatus generally about its forward edge relative to the ground. The rearward corner of the base must then be secured in the elevated position while the object is being raised or lowered along the face of the cliff or building. Further, the rearward corner must be manually moved back into contact with the ground when the object is at a height above the surface on which the base is supported so as to cause the support member and, therefore, the object to move to a position inwards of the edge of the cliff, building etc. The object can then be lowered to the surface and disconnected from the tripod apparatus at a position spaced inwards from the edge of the cliff or building.

While such known tripod apparatus is useful, the need to move the whole of the apparatus so as to move the support member is inconvenient. Further, when the support member is in its extended position, the weight of the object being raised or lowered is only supported by the forward edge of the base which arrangement can be unstable. Further, it will be apparent that the procedure of raising and lowering the rearward corner of the base introduces a risk whereby, if the rearward corner of the base is accidentally released during the procedure, the apparatus is likely to topple over the edge of the cliff or building.

It would be desirable to provide an improved tripod apparatus which is able to move the support member between retracted and extended positions without necessarily having to move any part of the base of the tripod away from an initial position securely sitting on the ground.

SUMMARY OF THE INVENTION

The present invention provides a tripod apparatus comprising:

a base;

a support member for supporting an object, the support member being supported generally above the base by a plurality of upright members;

a first and a second upright member each having one end pivotally connected to the base at spaced positions, and being pivotal about a common pivot axis which defines a forward edge of the base, and wherein the other ends of the first and second uprights are connected to the support member;

a third upright member extends from a pivotal connection to the base which is spaced rearwardly of the forward edge, to the support member, the third upright member being moveable so that, in use, it can be operated so as to pivot the first and second upright members about the pivot axis and move the support member from a retracted position rearward of the forward edge to an extended position forward of the forward edge.

Preferably, the third upright member is in the form of a bar linkage comprising a first elongate member pivotally connected at one end to the support member and at its other end to an intermediate position of a second elongate member, the second elongate member having one end pivotally connected to the rearward position of the base; wherein the second elongate member defines a lever to move the intermediate position thereof relative to the forward edge of the base which movement is transmitted to the support member by the first elongate member.

Preferably, the lever is moveable between a first position extending rearwardly from the rearward position of the base wherein the support member is in the retracted position, and a second position extending parallel and adjacent to the first elongate member wherein the support member is in its extended position.

Preferably, each of the first, second and third upright members have selectively adjustable lengths.

Preferably, the connections of the first, second and third upright members to the support member and to the base are selectively detachable.

Preferably, the base comprises a first elongate bar to which the first and second upright members are pivotally connected; a second bar positioned generally parallel to, and spaced rearwardly of the first bar which includes the rearward position of the base at which the third upright member is pivotally connected, and two elongate struts extending from opposite ends of the first bar to respective opposite ends of the second bar.

Preferably, the first bar is substantially longer than the second bar so that the bars and the struts, when connected together, define a generally triangular form of the base.

Preferably, the struts have a selectively adjustable length and are detachably connected to the bars.

Preferably, the base includes a plurality of support legs, each leg having a pivotal foot pad at one end and a selectively lockable castor at its other end, the tripod apparatus being assembled so that either the castors or the foot pads support the base, or a combination of castors and foot pads support the base.

Preferably, each support leg is selectively height adjustable relative to the base so that, in use, the base can be caused to be generally level despite irregularities of the ground surface upon which the base is supported.

BRIEF DESCRIPTION OF THE DRAWINGS

Preferred forms of the present invention will now be described by way of example with reference to the accompanying drawings, wherein;

FIG. 1a is a schematic perspective view of the tripod apparatus with the support member in its retracted position;

FIG. 1b is a schematic perspective view of a leg of the tripod apparatus of FIG. 1a;

FIG. 3 shows views of various components of the tripod apparatus shown in FIGS. 1 and 2;

FIG. 6 is a schematic perspective view of an alternate arrangement of the tripod apparatus of the present invention for providing a support above a manhole or the like.

DETAILED DESCRIPTION OF THE INVENTION

Figures 1A, 1B:
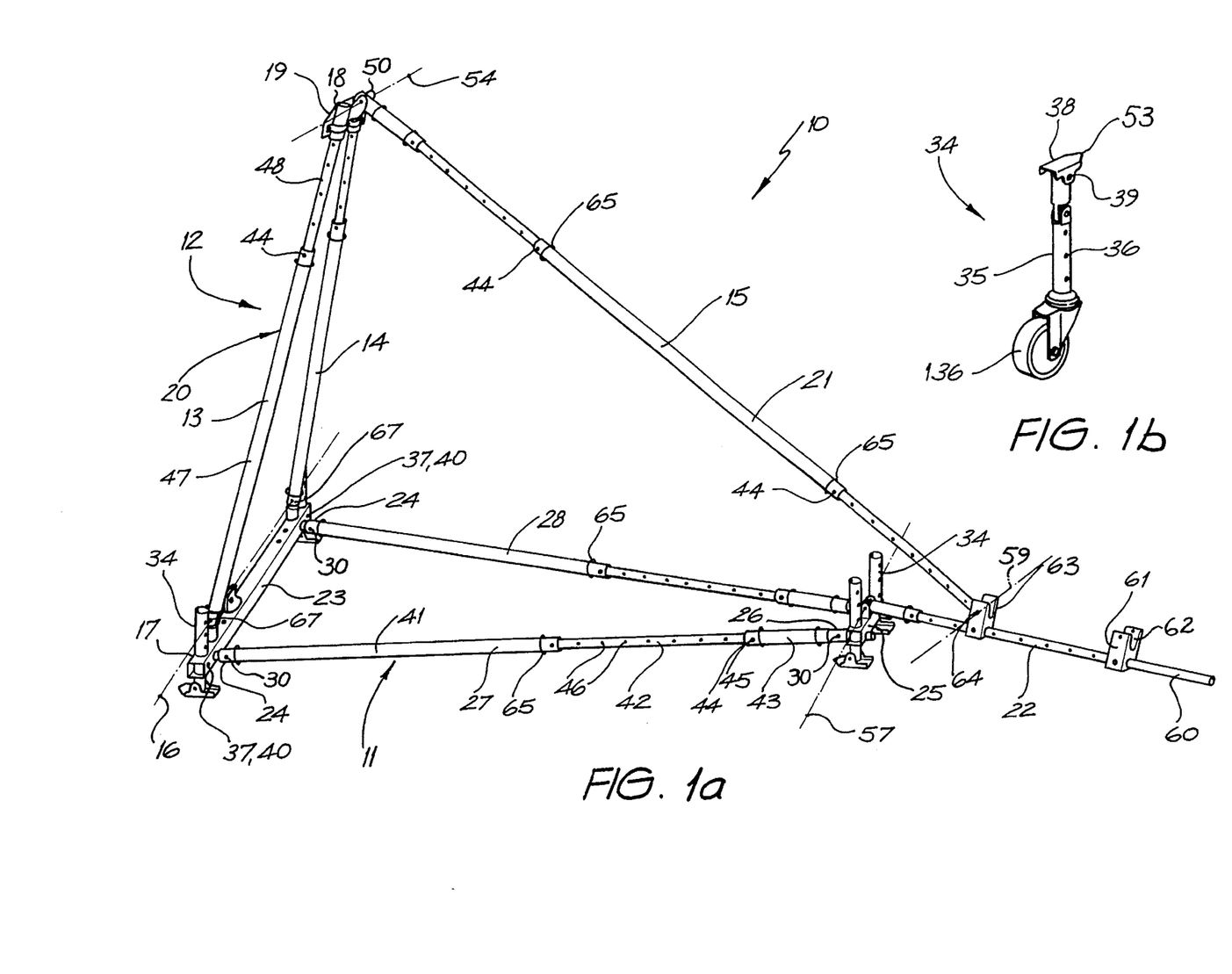
Figure 2:
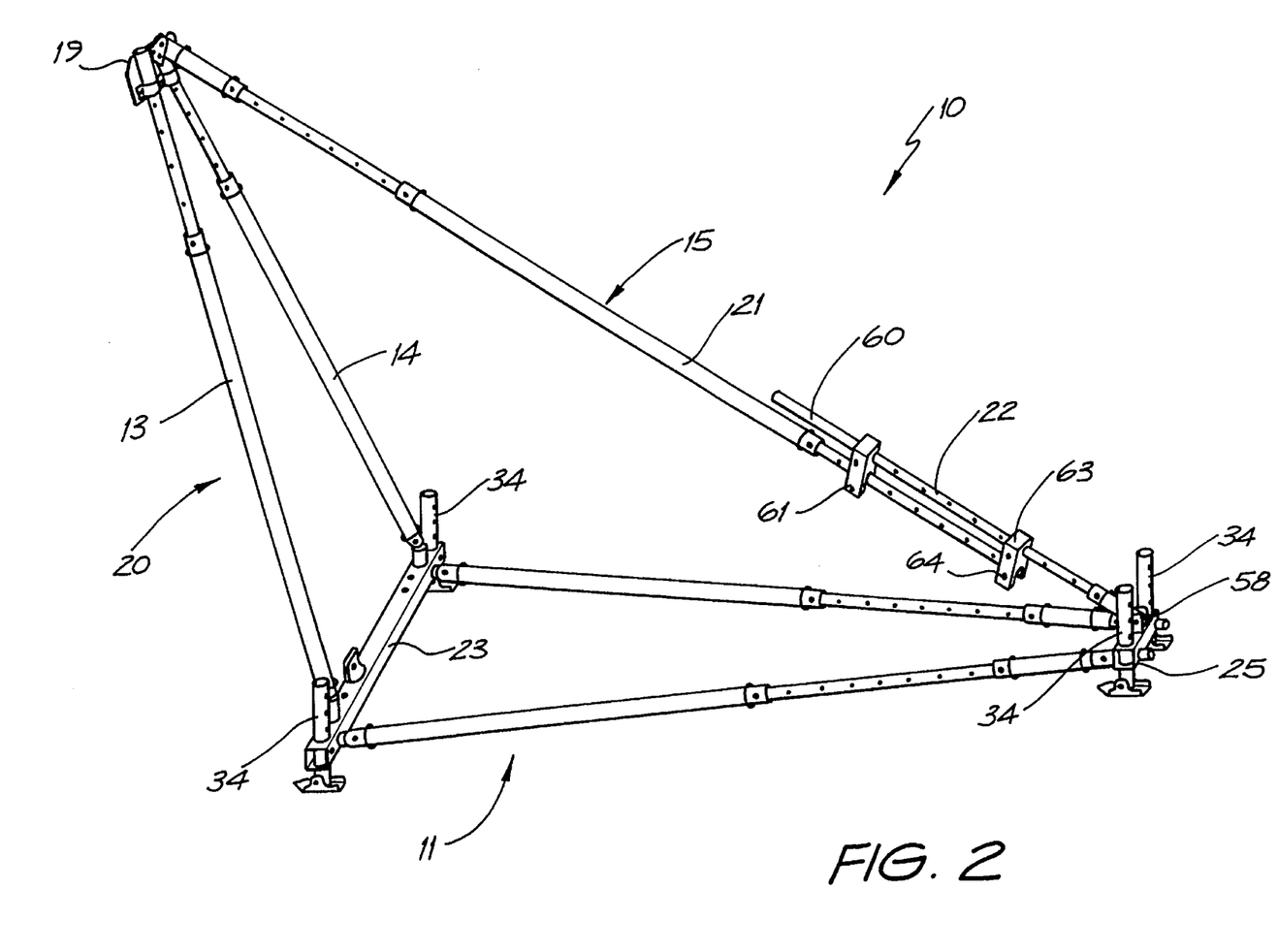
FIG. 2 is a schematic perspective view of the tripod apparatus of FIG. 1 with the support member in its extended position.
Figure 5:
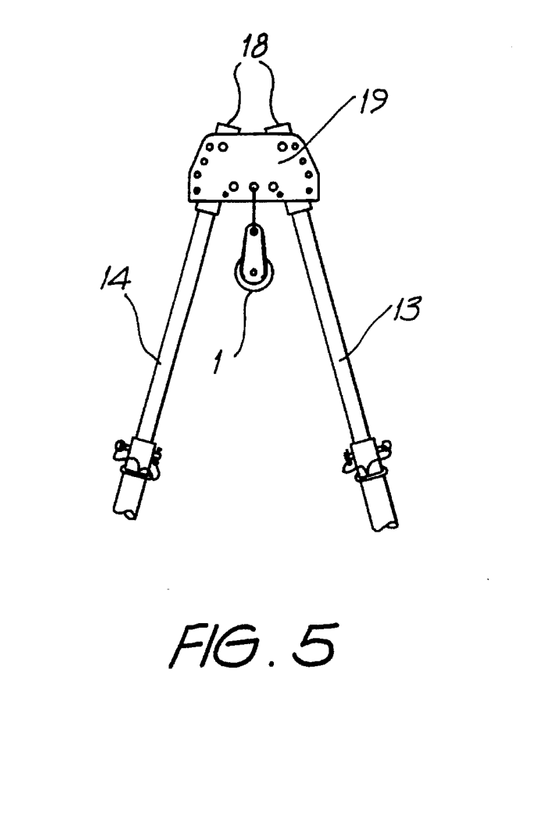
FIG. 5 is a detailed front elevational view of the first and second upright members and the support member of the present invention, and a pulley supported by the support member.

Referring to FIGS. 1a, 1b and 2, there is shown a tripod apparatus 10 including a generally triangular base 11 which supports a tripod 12. The tripod 12 includes first, second and third upright members 13, 14 and 15 and a support member 19 having an attachment point for a pulley 1 or other device as shown in FIG. 5.

Figure 3A:
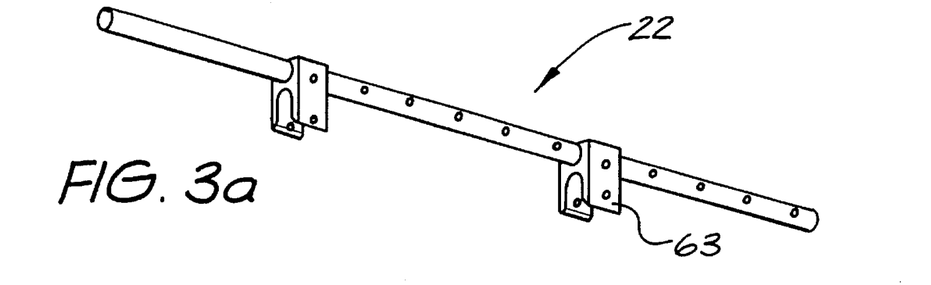
FIG. 3(a) is a schematic perspective view of an elongated member of the tripod apparatus.
Figure 3B:
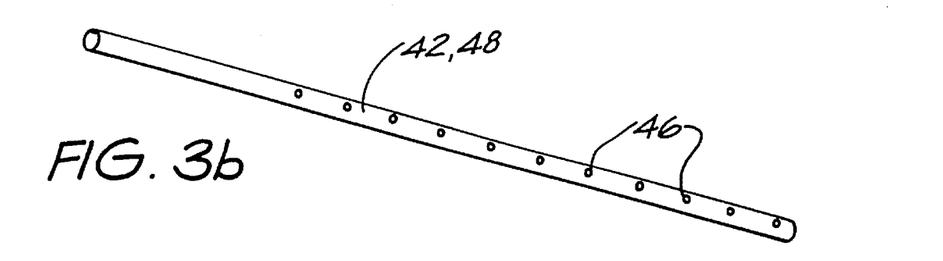
FIG. 3(b) is a schematic perspective view of another elongated member of the tripod apparatus.
Figure 3C:
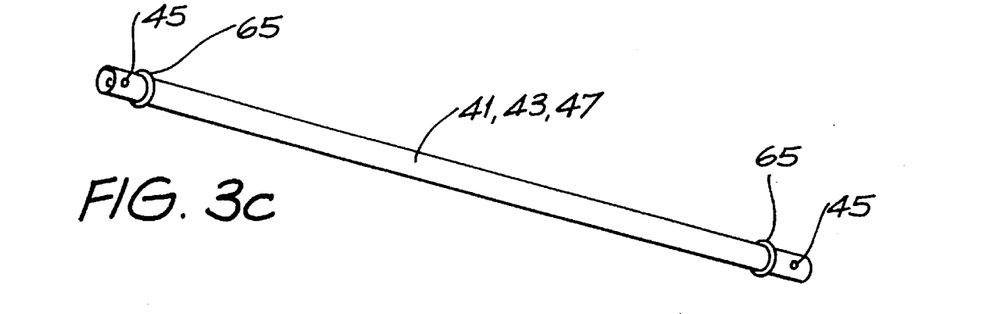
FIG. 3(c) is a schematic perspective view of a tube section of the tripod apparatus.
Figure 3D:
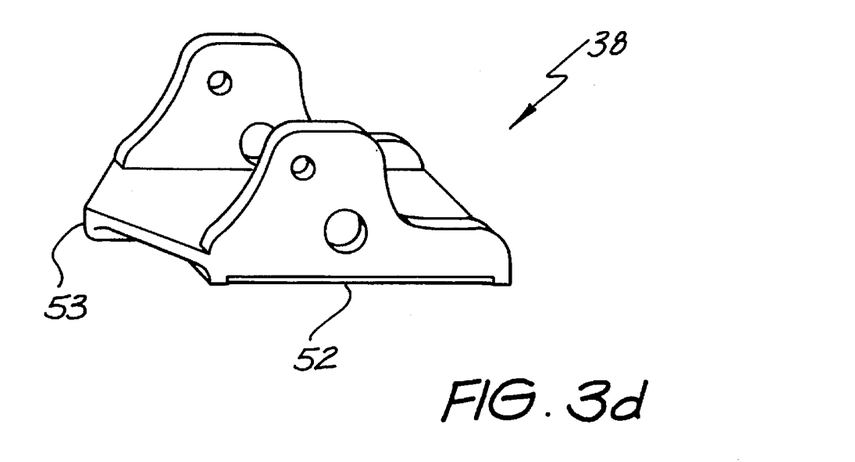
FIG. 3(d) is a schematic perspective view of a foot member of the tripod apparatus.
Figure 3E:
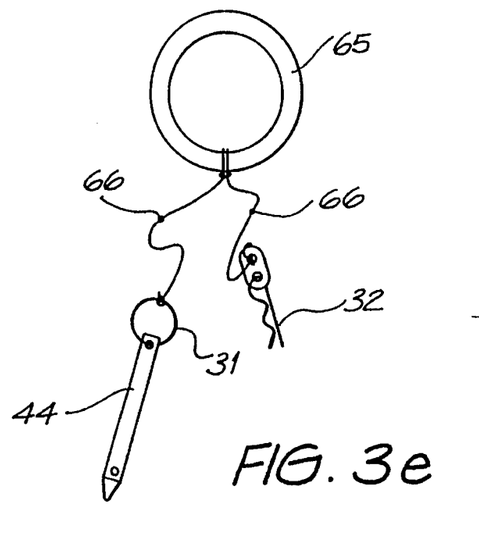
FIG. 3(e) is a perspective view of a retention pin and cotter pin assembly of the present invention.
Figure 3F:
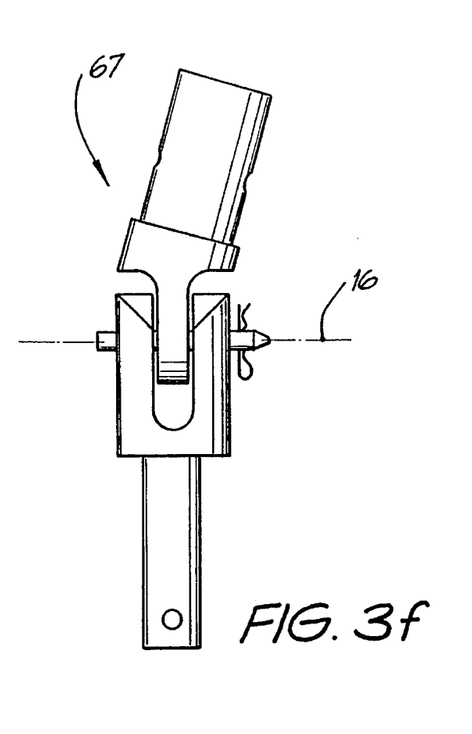
FIG. 3(f) is a front perspective view of a pivotal connector of the present invention.

The first and second upright members 13, 14 are each detachably connected at a lower end thereof to respective pivotal connectors 67, shown in FIG. 3(f), on the base 11 so as to be pivotal about a common pivot axis 16. The pivotal connectors 67 for the first and second upright members 13, 14 are at spaced positions along a forward edge 17 of the base 11.

The other ends 18 of the upright members 13, 14 are connected to the support member 19 so that they form an A-frame 20 which pivots about the pivot axis 16 relative to the base 11. Further, the A-frame 20 defines a space between the upright members 13, 14 and the forward edge 17 of the base 11 which preferably is large enough to allow a basket (not shown) supported from the support member 19 to, in use, move therethrough.

The A-frame 20 is, in use, maintained in a generally upright position by the third upright member 15. The third upright member 15 includes two elongate members 21, 22 which are articulated so as to enable the position of the support member 19 to be moved relative to the base 11 as explained in detail below. The elongate member 22 is further shown in FIG. 3(a).

The base 11 includes a first elongate bar 23 forming the forward side 17 of the base 11, and which has strut connectors 24 provided at each end thereof. A second elongate bar 25 similarly has strut connectors 26 at opposite ends thereof. The second bar 25 is substantially shorter than the first bar 23 and is arranged generally parallel to, and rearwardly spaced from the first bar 23. There is also first and second extendable struts 27, 28. One end of the first strut 27 is received in one of the strut connectors 24 of the elongate bar 23, and the other end is received in one of the strut connectors 26 of the shorter bar 25. Similarly, the second strut 28 is connected to the other ones of the strut connectors 24, 26.

The struts 27, 28 are detachably retained in the connectors 24, 26 by retention pins 44 inserted through aligned holes 30 in each of the strut connectors 24, 26 and in the ends of the struts 27, 28. The retention pins 44 are themselves kept securely in place by a ring 31 at one end and a cotter pin 32 at the other end as shown in FIG. 3(e).

In this way, the bars 23, 25 and the struts 27, 28 are selectively detachably connected together. In the assembled condition, the base 11 has a generally triangular form.

The base 11 is supported on the ground by four legs 34 one each at respective ends of both of the bars 23 and 25. The legs 34 are each in the form of a short tube 35 having a plurality of spaced through-holes 36. At one end of the tube 35 there is a foot pad 38 pivotally mounted thereto about a pivot pin 39 which, in use, is generally parallel to the pivot axis 16 of the A-frame 20. At the other end of the tube 35 there is a castor 136 mounted thereto.

The foot pad 38 is pivotal between a first position extending generally normal to the axis of the tube 35 to provide a flat surface 52 on which the base 11 can rest. Alternatively, the foot pad 38 can be pivoted into a position extending generally parallel to the tube 35 so that a pointed end 53 defines the extreme end of the leg 34 and which can, in use, engage, for example, soft earth to firmly locate the base 11.

The tube 35 of each leg 34 is slidably received in a respective hole provided in the bars 23, 25 and is secured in place by a retention pin 37 received through another hole 40 in the bar 23, 25 and a selected one of the holes 36 in the tube 35. In this way, the effective height of each leg 34 can be independently adjusted and the base 11 can be supported in a generally level position on an irregular surface. Further, the base 11 can be constructed so that either the foot pads 38 or the castors 36, or a combination of the foot pads 38 and castors 36, rest on the ground.

The struts 27, 28 are each formed by three tube sections 41, 42 and 43 as shown in FIGS. 3(b) and 3(c). The first tube section 41 forms one end of the strut 27, 28, and the second tube section 43 forms the other end. The third tube section 42 is telescopically received in each of the first and second tube sections 41, 43, and is locked relative to each by respective retention pins 44 which are received through a hole 45 provided near the inner ends of the first and second tube sections 41,43, and a respective aligned one of a plurality spaced holes 46 provided along the third tube section 42. In this way, the length of the stuts 27,28 is selectively adjustable. The retention pins 44 are each secured in place by a cotter pin 32.

Similarly, the first and second upright members each comprise two tube sections 47, 48. One end of the first tube section 47 connects to the pivotal connector 67 of the first bar 23 and is retained therein by a retention pin 44 and cotter pin 32.

The second tube section 48 is telescopically received in the other end of the first tube section 47 with the distal end of the second tube section 47 being received in a connector of the support member 19.

The first and second tube sections 47,48 are secured together by a retention pin 44 and cotter pin 32. In this way, the length of the first and second upright members 13,14 can be selectively adjusted.

The third upright member 15 is formed in two parts 21,22. The first part 21 is formed from four tube sections similar to those which form the struts 27, 28 so as to have a selectively adjustable in length. One end of the first part 21 detachably connects to a pivotal connector 50 of the support member 19 so as to be pivotal about a pivot axis 54 which is generally parallel to the pivot axis 16.

The second part 22 is detachably connected at one end to the pivotal connector 58 of the second bar 25 so that it is pivotal about a pivot axis 57 which is generally parallel to the pivot axis 16.

At an intermediate position of the second part 51, there is a pivot block 63 to which the other end of the first part 21 is pivotally connected. The pivotal connection 64 to the pivot block 63 allows the first part 21 to pivot about a pivot axis 59 relative to the second part 22. The pivot axis 59 is also generally parallel to the pivot axis 16.

The second part 22 projects beyond the pivotal connection 64 with the first part 21 and defines a lever 60 for selectively moving the other end of the first part 21. This movement is transmitted via the first part 21 into movement of the support member 19 about the pivot axis 16.

The lever 60 also includes a resilient locating block 61 at a position spaced outwardly from the intermediate pivotal connection 64. The locating block 61 has a recess 62 which, in use, is positioned to resiliently receive and locate the first part 21.

The lever 60 is moveable between a first position extending away from and generally in the plane of the base 11 wherein the support member 19 is in a retracted position generally within the confines of the base 11 as shown in FIG. 1, and a second position generally parallel and adjacent the first part 21 wherein the support member 19 is positioned outside of the base 11 beyond the forward side 17 as shown in FIG. 2. In the second position, the upright member 15 is securely fixed with further pivotal movement of the first part 21 relative to the second part 22 prevented since it bears against the second part 22 via the locating block 61.

In use, the forward side 17 of the base 11 is positioned immediately adjacent the edge of a cliff or building, and the base 11 is firmly secured to the ground in this position using anchor points (not shown) on the base 11.

A basket (not shown) is supported from the attachment point of the support member 19 and can be moved from a position hanging beyond the edge of the cliff, building or the like (ie. in the extended position of the support member 19), through the space in the A-frame 20, and to a position above the base 11 and inwards of the edge of the cliff, building or the like (ie. in the retracted position of the support member 19) without having to move the base 11. As such, the movement of the support member 19 is effected by a simple yet surprisingly effective and reliable mechanism, and the weight of the basket is at all times supported in a stable manner by the base 11 which remains firmly secured to the ground.

Figure 4:
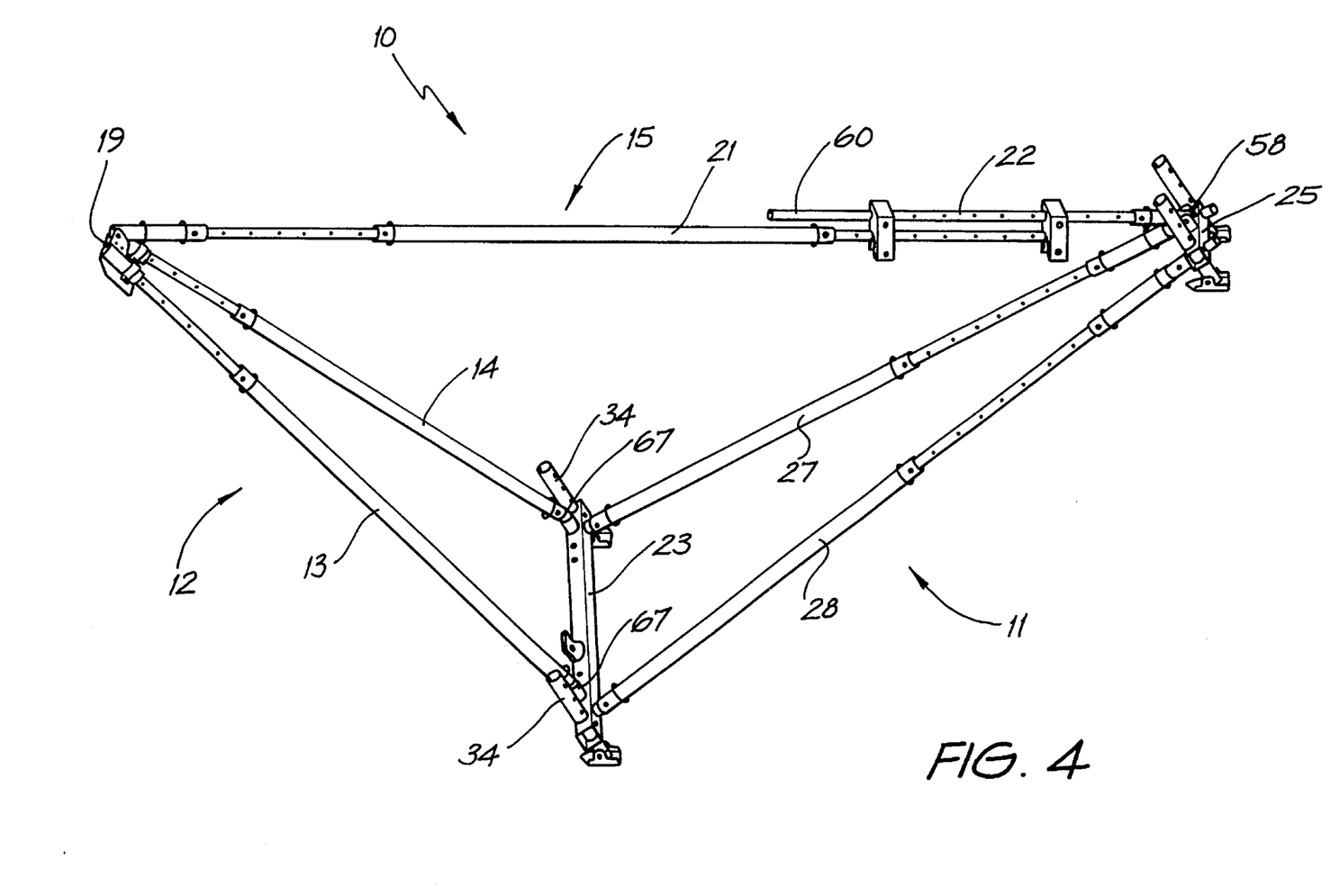
FIG. 4 is a schematic perspective view of the tripod apparatus shown in FIG. 2 wherein the support member is in a further extended position with a rearward corner of the base raised above ground level.

Of course, if required, the support member 19 can be moved to a further extended position by physically raising the rearward end of the base 11 (eg using pulleys—not shown) about the pivot axle 39 of the foot pads 38 to an elevated position as shown in FIG. 4. Referring to FIG. 5, the support member 19 has a pulley 1 suspended therefrom for raising and lowering a basket (not shown).

Figure 6:
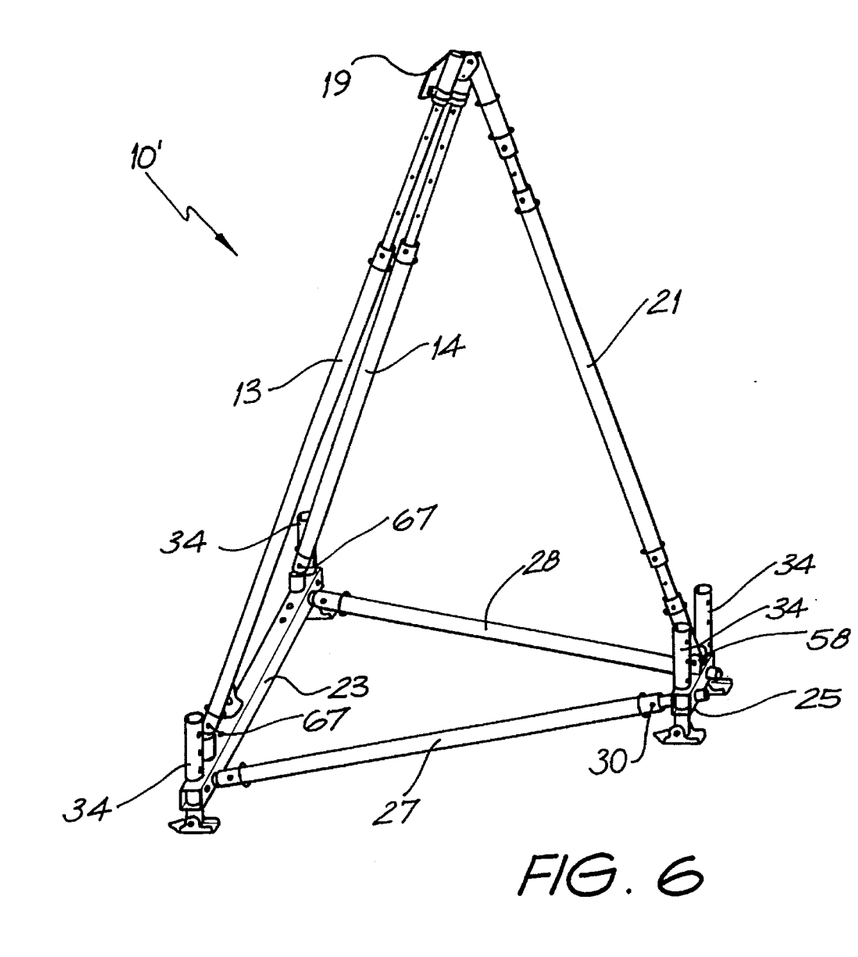

Referring to FIG. 6, the apparatus 10 has been reconfigured so that the struts 27,28 are about the same length as the first bar 23, and the tripod 10' is formed with the upright members 13,14 and the first part 21 only of the third upright member 15. The upright members 13,14 and the first part 21 are caused to have the same length so as to position the support member 19 generally centrally of and directly above the base 11. In this configuration, the apparatus 10' is useful as a support over a manhole or the like. As such, the apparatus 10' is also very versatile.

Further, the various components of the tripod apparatus 10 can be disassembled by detaching the components from one another so that the apparatus 10 can be stored and transported in a compact form. When the components are disconnected from one another, the retention pins 44 and cotter pins 32 are conveniently connected to the tubes forming the struts 27,28 and upright members 13,14,15 by a ring 65 affixed to the tubes near the connection points and flexible elongate ties 66 (refer FIG. 3(e)).

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A tripod apparatus comprising:

a base;

a support member for supporting an object generally above the base;

a first and a second upright member each having one end pivotally connected to the base at spaced positions about a common pivot axis which defines a forward edge of the base, and other ends of the first and second upright members connected to the support member; and a third upright member having a first end pivotally connected to the base at a rearward position which is spaced rearwardly of the forward edge, and a second end connected to the support member, the third upright member including means for extending the third upright member to permit pivoting of the first and second upright members about the common pivot axis to move the support member from a retracted position rearward of the forward edge to an extended position forward of the forward edge.

2. The apparatus of claim 1 wherein the third upright member is in the form of a bar linkage comprising a first elongate member pivotally connected at one end to the support member and at another end to an intermediate position of a second elongate member, the second elongate member having one end pivotally connected to the rearward position of the base; and wherein the second elongate member defines a lever to move the intermediate position thereof relative to the forward edge of the base which movement is transmitted to the support member by the first elongate member.

3. The apparatus of claim 2 wherein the lever is moveable between a first position extending rearwardly from the rearward position of the base wherein the support member is in the retracted position, and a second position extending parallel and adjacent to the first elongate member wherein the support member is in the extended position.

4. The apparatus of claim 3 wherein each of the first, second and third upright members have selectively adjustable lengths.

5. The apparatus of claim 1 wherein the first, second and third upright members are selectively detachable from the base.

6. The apparatus of claim 1 wherein the base comprises a first elongate bar to which the first and second upright members are pivotally connected; a second bar positioned generally parallel to, and spaced rearwardly of the first bar which includes the rearward position of the base at which the third upright member is pivotally connected, and two elongate struts extending from opposite ends of the first bar to respective opposite ends of the second bar.

7. The apparatus of claim 6 wherein the first bar is substantially longer than the second bar so that the bars and the struts, when connected together, define a generally triangular form of the base.

8. The apparatus of claim 7 wherein the struts have a selectively adjustable length and are detachably connected to the bars.

9. The apparatus of claim 1 wherein the base includes a plurality of support legs, each leg having a pivotal foot pad at one end and a selectively lockable castor at another end.

10. The apparatus of claim 9 wherein each support leg is selectively height adjustable relative to the base so that, in use, the base can be caused to be generally level despite irregularities of ground surface upon which the base is supported.

11. The apparatus of claim 1 wherein the first, second and third upright members are selectively detachable from the support member.

12. A tripod apparatus comprising:

a base defining a forward edge and a rearward position spaced from the forward edge;

a support member for supporting an object generally above said base;

a first and a second upright member each having one end pivotally connected to the base at spaced positions about a common pivot axis which defines a forward edge of the base, and other ends of the first and second upright members connected to the support member; and a third upright member in the form of a bar linkage including a first elongate member and a second elongate member, the first elongate member being pivotally connected at one end to the support member and at another end to an intermediate position of the second elongate member, the second elongate member having one end pivotally connected to the rearward position of the base to function as a lever to move the intermediate position thereof relative to the forward edge of the base which movement is transmitted to the support member by the first elongate member so as to pivot the first and second upright members about the common pivot axis and move the support member from a retracted position rearward of the forward edge to an extended position forward of the forward edge.

13. A tripod apparatus comprising:

a base;

a support member for supporting an object generally above the base;

a first and a second upright member each having one end pivotally connected to the base at spaced positions about a common pivot axis which defines a forward edge of the base, and other ends of the first and second upright members connected to the support member; and a third upright member being in the form of a bar linkage including a first elongate member and a second elongate member, the first elongate member being pivotally connected at one end to the support member and at another end to an intermediate position of the second elongate member, the second elongate member having one end pivotally connected to a rearward position of the base to function as a lever to move the intermediate position thereof relative to the forward edge of the base which movement is transmitted to the support member by the first elongate member, the second elongate member being moveable between a first position extending rearwardly from the rearward position of the base wherein the support member is in a retracted position, and a second position extending parallel and adjacent to the first elongate member wherein the support member is in an extended position so that the support member is operable to pivot the first and second upright members about the common pivot axis and move the support member from said retracted position rearward of the forward edge to said extended position forward of the forward edge.

14. A tripod apparatus comprising:

a base;

a support member for supporting an object generally above said base;

a first and a second upright member each having one end pivotally connected to the base at spaced positions about a common pivot axis which defines a forward edge of the base, and other ends of the first and second upright members connected to the support member; and a third upright member having a first end pivotally connected to the base at a rearward position which is spaced rearwardly of the forward edge, and a second end connected to the support member, the third upright member including means for extending the third upright member to permit pivoting of the first and second upright members about the common pivot axis to move the support member from a retracted position rearward of the forward edge to an extended position forward of the forward edge;

the base including a first elongate bar to which the first and second upright members are pivotally connected, a second bar positioned generally parallel to and spaced rearwardly of the first bar, the second bar defining the rearward position of the base at which the third elongate member is pivotally connected, and two elongate member struts extending from opposite ends of the first bar to respective opposite ends of the second bar; and the first bar being substantially longer than the second bar so that the first and second bars and the struts, when connected together, define a generally triangular form of the base.

15. A tripod apparatus comprising:

a base;

a support member for supporting an object generally above the base;

a first and a second upright member each having one end pivotally connected to the base at spaced positions about a common pivot axis which defines a forward edge of the base, and other ends of the first and second upright members connected to the support member;

a third upright member having a first end pivotally connected to the base at a rearward position which is spaced rearwardly of the forward edge, and a second end connected to the support member;

means for displacing the third upright member to permit pivoting of the first and second upright members about the common pivot axis to move the support members from a retracted position rearward of the forward edge to an extended position forward of the forward edge; and the base including a first elongate bar to which the first and second upright members are pivotally connected, a second bar positioned generally parallel to and spaced rearwardly of the first bar, the second bar defining the rearward position of the base at which the third elongate member is pivotally connected, and two elongate member struts extending from opposite ends of the first bar to respective opposite ends of the second bar.

16. The tripod apparatus of claim 15 wherein the first bar is substantially longer than the second bar so that the first and second bars and the struts, when connected together, define a generally triangular form of the base.

17. The apparatus of claim 16 wherein the struts have a selectively adjustable length and are detachably connected to the bars.

18. The apparatus of claim 15 wherein the base includes a plurality of support legs, each leg having a pivotal foot pad at one end and a selectively lockable castor at its other end.

19. The apparatus of claim 18 wherein each support leg is selectively height adjustable relative to the base so that, in use, the base can be caused to be generally level despite irregularities of a ground surface upon which the base is supported.

* * * * *